(12) United States Patent
Watanabe

(10) Patent No.: US 8,077,361 B2
(45) Date of Patent: Dec. 13, 2011

(54) OPTICAL SCANNING APPARATUS AND IMAGE FORMING APPARATUS USING SAME

(75) Inventor: Kazunori Watanabe, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 801 days.

(21) Appl. No.: 12/073,673

(22) Filed: Mar. 7, 2008

(65) Prior Publication Data

US 2008/0225349 A1 Sep. 18, 2008

(30) Foreign Application Priority Data

Mar. 9, 2007 (JP) ................................. 2007-059835

(51) Int. Cl.
*H04N 1/04* (2006.01)

(52) U.S. Cl. ......... 358/481; 358/474; 358/475; 358/494

(58) Field of Classification Search .................. 358/481, 358/474, 475, 494; 359/201
See application file for complete search history.

(56) References Cited

U.S. PATENT DOCUMENTS

| | | | | |
|---|---|---|---|---|
| 5,183,350 A | * | 2/1993 | Kramer | 403/4 |
| 5,828,479 A | * | 10/1998 | Takano et al. | 359/201.1 |
| 5,963,353 A | * | 10/1999 | Shibuya et al. | 359/198.1 |
| 7,193,760 B2 | * | 3/2007 | Kuribayashi | 359/198.1 |

FOREIGN PATENT DOCUMENTS

| | | |
|---|---|---|
| JP | 2942721 | 6/1999 |
| JP | 2000-330046 | 11/2000 |
| JP | 2000-352682 | 12/2000 |
| JP | 2001-027736 | 1/2001 |
| JP | 2001-075038 | 3/2001 |
| JP | 2002-072612 | 3/2002 |
| JP | 2002-299735 | * 11/2002 |
| JP | 3911404 | 2/2007 |
| JP | 2007-144952 | 6/2007 |

OTHER PUBLICATIONS

Abstract of JP 09-043523 published Feb. 14, 1997.
Abstract of JP 2003-161902 published Jun. 6, 2003.
Office Action dated May 6, 2011 for corresponding Japanese Patent Application No. 2007-059835.

* cited by examiner

*Primary Examiner* — Houshang Safaipour
(74) *Attorney, Agent, or Firm* — Harness, Dickey & Pierce, P.L.C.

(57) ABSTRACT

An optical scanning apparatus is detachably mountable in an image forming apparatus. The optical scanning apparatus includes a light source unit to simultaneously emit a plurality of light beams; an optical element unit including an optical element to focus light beams deflected by the optical element onto a surface to be scanned, and hold the light source unit in a rotatively adjustable manner; and a rotation adjustment unit to adjust a position of the light source unit relative to the optical element unit in a rotation direction when an external force acts on the rotation adjustment unit. The rotation adjustment unit is disposed at a rear end of the optical scanning apparatus in an inserting direction to the image forming apparatus or at an adjustable position when the optical scanning apparatus is installed in the image forming apparatus.

17 Claims, 14 Drawing Sheets

OPTICAL SCANNING APPARATUS AND IMAGE FORMING APPARATUS USING SAME

CROSS-REFERENCE TO RELATED APPLICATIONS

This patent application is based on and claims priority pursuant to 35 U.S.C. §119 from Japanese Patent Application No. 2007-059835, filed on Mar. 9, 2007 in the Japan Patent Office, the entire contents which are hereby incorporated herein by reference.

BACKGROUND OF THE INVENTION

1. Field of the Invention

Exemplary aspects of the present invention generally relate to an optical scanning apparatus and an image forming apparatus using the optical scanning apparatus.

2. Description of the Background Art

Image forming apparatuses such as a copier, a printer, and a facsimile using a photoreceptor serving as a latent image carrier have come to be known. In such an image forming apparatus, the photoreceptor is irradiated with deflected and scanned light beams corresponding to image information, thereby forming a latent image thereon. A visible image is then formed by developing the latent image.

An optical scanning apparatus that deflects and scans the light beams is generally equipped with a light source, a polygon mirror having a plurality of mirror surfaces that rotates while deflecting and scanning the light beams from the light source, and an optical element such as an imaging lens or the like that focuses the light beams deflected and scanned by the polygon mirror on the surface of the photoreceptor.

These components are installed in a housing. In order to prevent the optical devices, for example, the imaging lens, from getting contaminated with dust or other contaminants, the housing is covered and sealed with a cover member or the like.

One method of increasing a speed of forming the latent image on the photoreceptor by the optical scanning apparatus involves, for example, increasing a rotation speed of the polygon mirror. In such a method, durability of a motor that rotates the polygon mirror and material of the polygon mirror become an issue. Consequently, the speed of forming the latent image is limited.

Japanese Patent No. 2942721 discloses another example of an optical scanning apparatus which may increase the speed of forming the latent image. In the optical scanning apparatus, a so-called multi-beam optical scanning apparatus, a plurality of light beams serving as writing beams is simultaneously emitted and scans the photoreceptor.

In the multi-beam optical scanning apparatus, a resolution in a sub-scan direction is determined based on the rotation speed of the photoreceptor and a space (hereinafter referred to as a beam pitch) between each scan line of the plurality of scan lines.

However, due to variations occurring during installation when the plurality of light sources are installed in the optical scanning apparatus and/or variations in the processing of the optical element, it is difficult to obtain a predetermined beam pitch in a uniform assembly process. Consequently, upon shipment of the optical scanning apparatus or the image forming apparatus, adjustment of the beam pitch is necessary.

The optical scanning apparatus disclosed in Japanese Patent No. 2942721 includes a light source unit having the light source and a coupling lens, and an optical housing serving as an optical element unit to which an optical element as an optical scanning system is installed.

The light source unit is rotated about a rotary shaft substantially parallel to an optical axis of the light beams emitted from the light source unit relative to the optical housing to adjust the beam pitch.

The image forming apparatus including the multi-beam optical scanning apparatus is shipped after the beam pitch is adjusted. However, when the image forming apparatus is used and some parts may need to be replaced due to a failure of the light source and so forth, or when the beam pitch may need to be readjusted due to deterioration over time, the light source unit needs to be rotated in actual use to determine the position and re-adjust the beam pitch to obtain an optimal pitch.

The optical scanning apparatus disclosed in Japanese Patent No. 2942721 has a structure that allows the light source unit to rotate using a rotary driver such as a stepping motor or the like. The beam pitch can be electrically readjusted by inputting driving information of the rotary driver from an operation panel of the image forming apparatus.

However, the use of the rotary driver such as the stepping motor causes an increase in cost of the structure designated for adjustment of the beam pitch. Therefore, in order to reduce the cost, parts with relatively low reliability may be utilized in the structure for adjusting the beam pitch. Consequently, it becomes a concern that an electrical failure may occur, resulting in a permanent failure of the beam pitch adjustment.

In an attempt to solve these problems, a structure having a rotary adjusting portion that mechanically adjusts the position of the light source in a rotary direction relative to the optical housing by exerting an external force using a tool may be suggested.

When the position of the light source unit in the rotary direction relative to the optical housing can be adjusted by the tool, the rotary driver is not necessary, thereby reducing the cost of the structure dedicated to the adjustment of the beam pitch, and also preventing the permanent failure of the beam pitch adjustment.

However, in the structure mechanically allowing the adjustment of the beam pitch, the adjustment may take a significant amount of time depending on the position of the rotary adjusting portion. Consequently, the time during which the image forming apparatus is not in operation may be lengthened, resulting in poor maintenance efficiency.

Specifically, in a case in which the rotary adjusting portion is disposed at a front end surface or a lateral side surface of the optical scanning apparatus in a direction of installation of the optical scanning apparatus in the image forming apparatus, the rotary adjusting portion is inaccessible in a state in which the optical scanning apparatus is installed in the image forming apparatus.

When adjusting the beam pitch, the optical scanning apparatus needs to be partially pulled out from the image forming apparatus to a certain position so that the rotary adjusting portion becomes accessible. Alternatively, the optical scanning apparatus needs to be removed from the image forming apparatus altogether.

Either pulling out or removing the optical scanning apparatus from the image forming apparatus every time the beam pitch needs to be adjusted may prolong the time needed for beam pitch adjustment and degrade the maintenance efficiency.

It should be noted that the structure of exerting an external force to the rotary adjusting portion is not limited to the tool. In other words, a similar if not the same problem as that described above may occur when an external force is exerted on the rotary adjusting portion by a human hand.

SUMMARY OF THE INVENTION

In view of the foregoing, exemplary embodiments of the present invention provide an optical scanning apparatus having a cost-effective, yet reliable structure for adjustment of a beam pitch, and an image forming apparatus using the optical scanning apparatus.

In one exemplary embodiment, an optical scanning apparatus is detachably mountable an installation portion of an image forming apparatus. The optical scanning apparatus includes a light source unit, an optical element unit, and a rotation adjustment unit.

The light source unit is configured to simultaneously emit a plurality of light beams. The optical element unit including an optical element is configured to focus the light beams deflected by the optical element onto a surface to be scanned, and hold the light source unit in a rotatively adjustable manner. The rotation adjustment unit is configured to adjust a position of the light source unit relative to the optical element unit in a rotation direction when an external force acts on the rotation adjustment unit. The rotation adjustment unit is disposed at a rear end of the optical scanning apparatus in a direction of insertion in the image forming apparatus.

Another exemplary embodiment provides an image forming apparatus that includes at least a latent image carrier, a developing unit, a transfer member, a recording medium storage unit, and the optical scanning apparatus. The latent image carrier includes a surface to bear a latent image thereon. The developing unit is configured to supply a developer to the latent image to develop. The transfer member is configured to transfer the image onto a recording medium. The recording medium storage unit is configured to store the recording medium. The optical scanning apparatus is detachably mountable in an installation portion of the image forming apparatus, and configured to irradiate the surface of the latent image carrier with a scan light to form the latent image thereon.

The optical scanning apparatus includes the light source unit to simultaneously emit a plurality of light beams; the optical element unit including an optical element, to focus the light beams deflected by the optical element onto a surface to be scanned, and hold the light source unit in a rotatively adjustable manner; and the rotation adjustment unit to adjust a position of the light source unit relative to the optical element unit in a rotation direction when an external force acts on the rotation adjustment unit.

The rotation adjustment unit is disposed at a rear end of the optical scanning apparatus in an inserting direction to the image forming apparatus.

Yet another exemplary embodiment provides an image forming apparatus that includes at least the latent image carrier, the developing unit, the transfer member, the recording medium storage unit, and the optical scanning apparatus.

The optical scanning apparatus includes the rotation adjustment unit disposed at an adjustable position when the optical scanning apparatus is installed in the image forming apparatus.

Additional features and advantages of the present invention will be more fully apparent from the following detailed description of exemplary embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein.

DETAILED DESCRIPTION OF EXEMPLARY EMBODIMENTS

Figure 1:
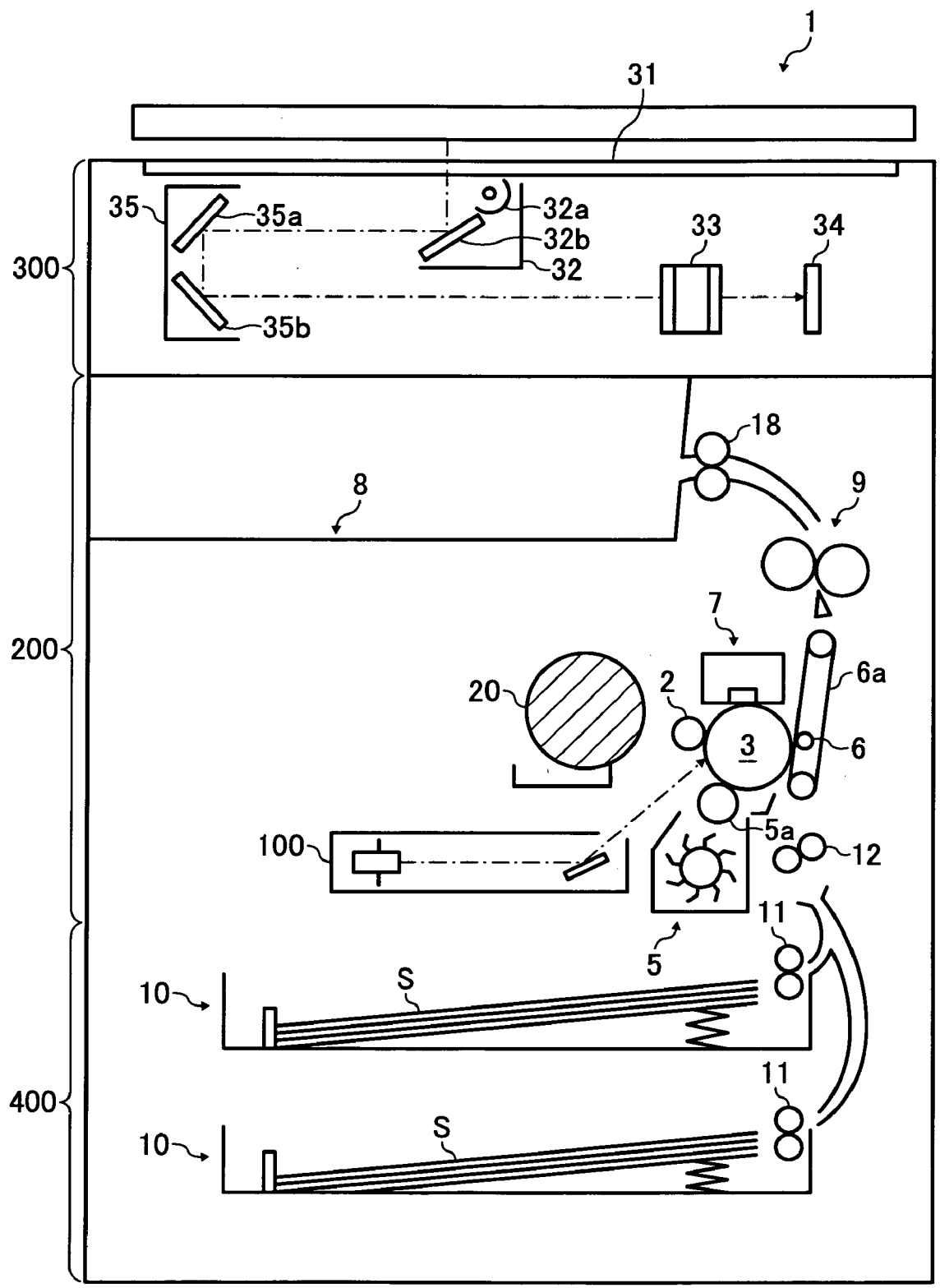
FIG. 1 is a schematic diagram illustrating an exemplary structure of an image forming apparatus, for example, a printer, according to an exemplary embodiment of the present invention.

It will be understood that if an element or layer is referred to as being "on," "against," "connected to" or "coupled to" another element or layer, then it can be directly on, against connected or coupled to the other element or layer, or intervening elements or layers may be present.

In contrast, if an element is referred to as being "directly on," "directly connected to" or "directly coupled to" another element or layer, then there are no intervening elements or layers present. Like numbers refer to like elements throughout figures. As used herein, the term "and/or" includes any and all combinations of one or more of the associated listed items.

Spatially relative terms, such as "beneath," "below," "lower," "above," "upper" and the like, may be used herein for ease of description to describe an element or an element's feature or relationship to another element(s) or feature(s) as illustrated in the figures.

It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, the term such as "below" can encompass both an orientation of above and below.

The device may be otherwise oriented at various angles (i.e. rotated 90 degrees or at other orientations), and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms.

These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Exemplary embodiments of the present invention are now explained below with reference to the accompanying drawings.

In the later described comparative example, exemplary embodiment, and alternative example, for the sake of simplicity of drawings and descriptions, the same reference numerals will be given to constituent elements such as parts and materials having the same functions, and the descriptions thereof will be omitted unless otherwise stated.

Typically, but not necessarily, paper is the medium from which is made a sheet on which an image is to be formed. Other printable media are available in sheets and their use here is included. For simplicity, this Detailed Description section refers to paper, sheets thereof, paper feeder, etc. It should be understood, however, that the sheets, etc., are not limited only to paper.

Referring now to the drawings, wherein like reference numerals designate identical or corresponding parts throughout the several views, particularly to FIG. 1, an image forming apparatus, for example, a laser printer using an electrophotographic method according to an exemplary embodiment of the present invention is described.

FIG. 1 is a schematic diagram illustrating one exemplary structure of an image forming apparatus 1 according to an exemplary embodiment of the present invention.

The image forming apparatus 1 of FIG. 1 may include an image forming unit 200 including a photoreceptor 3, a charger 2, a developing unit 5, a cleaning unit 7, an optical scanning apparatus 100 and so forth. The photoreceptor 3 serves as an image carrier. The developing unit 5 serves as a developing mechanism and includes a developing roller 5a. The cleaning unit 7 is configured to clean the photoreceptor 3. The optical scanning apparatus 100 is configured to write an electrostatic latent image on the photoreceptor 3.

The image forming unit 200 further includes a transfer roller 6 and a toner bottle 20. The transfer roller 6 is disposed facing the photoreceptor 3 nipping the transfer conveyance belt 6a therebetween, thereby forming a transfer nip. The toner bottle 20 serving as a supplemental developing agent container is configured to store toner as a supplemental developing agent to be supplied to the developing unit 5 which consumes the toner.

Below the image forming unit 200 is disposed a sheet feeding unit 400. The sheet feeding unit 400 includes sheet feed cassettes 10 serving as a storage for recording sheets, and sheet feed rollers 11. The sheet feed cassettes 10 each load transfer sheets S to be loaded on the loading surface.

The sheet feed rollers 11 are configured to separate the transfer sheets S loaded on the sheet feed cassettes 10 and transport the transfer sheet S one by one. The transfer sheet S sent by the sheet feed rollers 11 temporarily stops at a position where a registration roller 12 is disposed. The registration roller 12 is disposed before the photoreceptor 3.

At a time when a leading edge of an image formed on the photoreceptor 3 and a leading edge of the transfer sheet S arrive at the transfer nip between the photoreceptor 3 and the transfer roller 6 at a substantially same time, the transfer sheet S is fed in synchrony with rotation of the photoreceptor 3.

Above the image forming unit 200 is provided a fixing unit 9 serving as a fixing mechanism. The fixing unit 9 includes two rollers that form a fixing nip by pressing against each other while rotating and nipping a transportation path of the transfer sheet S therebetween.

At the downstream of the fixing unit 9 in the transfer sheet conveyance direction is provided a sheet eject roller 18. The sheet eject roller 18 is configured to eject the transfer sheet S which has passed the fixing nip to a catch tray 8.

Above the image forming unit 200 is provided an image reading unit 300. The image reading unit 300 in FIG. 1 includes at least a contact glass 31, a first carriage 32, and a second carriage 35 in order to scan a document, not shown, placed on the contact glass 31. The first carriage 32 includes a light source 32a for illuminating the document and a first mirror 32b. The second carriage 35 includes a second mirror 35a and a third mirror 35b.

The image information of the document scanned by the first carriage 32 and the second carriage 35 is read as an image signal by a CCD 34 disposed at the back of a lens 33. The image signal is digitized and then subjected to image processing.

Based on the image-processed signal, the later-described light source of the optical scanning apparatus 100 emits a light beam to scan the surface of the photoreceptor 3. Accordingly, an electrostatic latent image is formed on the surface of the photoreceptor 3.

Next, a description will be given of an image forming operation of the image forming apparatus 1. In the image forming apparatus 1, the photoreceptor 3 is evenly charged by the charger 2 while rotating. Subsequently, the optical scanning apparatus 100 is driven based on the image information externally input. Accordingly, the electrostatic latent image is formed on the charged region or an image forming region of the photoreceptor 3.

The electrostatic latent image is developed into a visible image with a developing agent, that is, toner supplied by the developing roller 5a of the developing unit 5, thereby forming a toner image.

While the toner image is formed on the photoreceptor 3, the sheet feed roller 11 draws out the transfer sheet S from the sheet feed cassette 10 selected from among the plurality of the sheet feed cassettes 11. The leading edge of the transfer sheet S comes into contact with the nip portion of the registration roller 12 and stands still.

When the registration roller 12 starts rotating so as to overlap with the toner image on the photoreceptor 3, the transfer sheet S is fed to the transfer nip formed between the photoreceptor 3 and the transfer roller 6. The toner image on the photoreceptor 3 is then transferred to the transfer sheet S at the transfer nip.

A discharge brush, not shown, discharges the transfer sheet S by coming into contact with the transfer sheet S. The discharged transfer sheet S is mechanically separated from the photoreceptor 3 and is fed to the fixing unit 9.

In the fixing unit 9, two rollers nip the transfer sheet S to enable the transfer sheet S to be heated and pressed so as to fix the toner image onto the transfer sheet S. Subsequently, the transfer sheet S on which the toner image is fixed is ejected onto the catch tray 8 by the discharge roller 18.

Any toner remaining on the surface of the photoreceptor 3 (hereinafter referred to as residual toner) after the transfer sheet S passed through the transfer nip is removed from the photoreceptor 3 and collected by the cleaning unit 7.

The foregoing description is of a copying function of the image forming apparatus 1, in which the image reading unit 300 reads the image information of the document placed on the contact glass 31 and an image is formed based on the image information. However, the image forming apparatus 1 serves not only as a copier, but also as a printer in which an image is formed based on image information input by an external electronic device, for example, a personal computer (PC) or the like.

Next, a description is given of the optical scanning apparatus 100. The optical scanning apparatus 100 according to one exemplary embodiment includes, for example, a multi-beam optical scanning apparatus in which the photoreceptor is simultaneously irradiated and scanned with a plurality of light beams.

Figure 2:
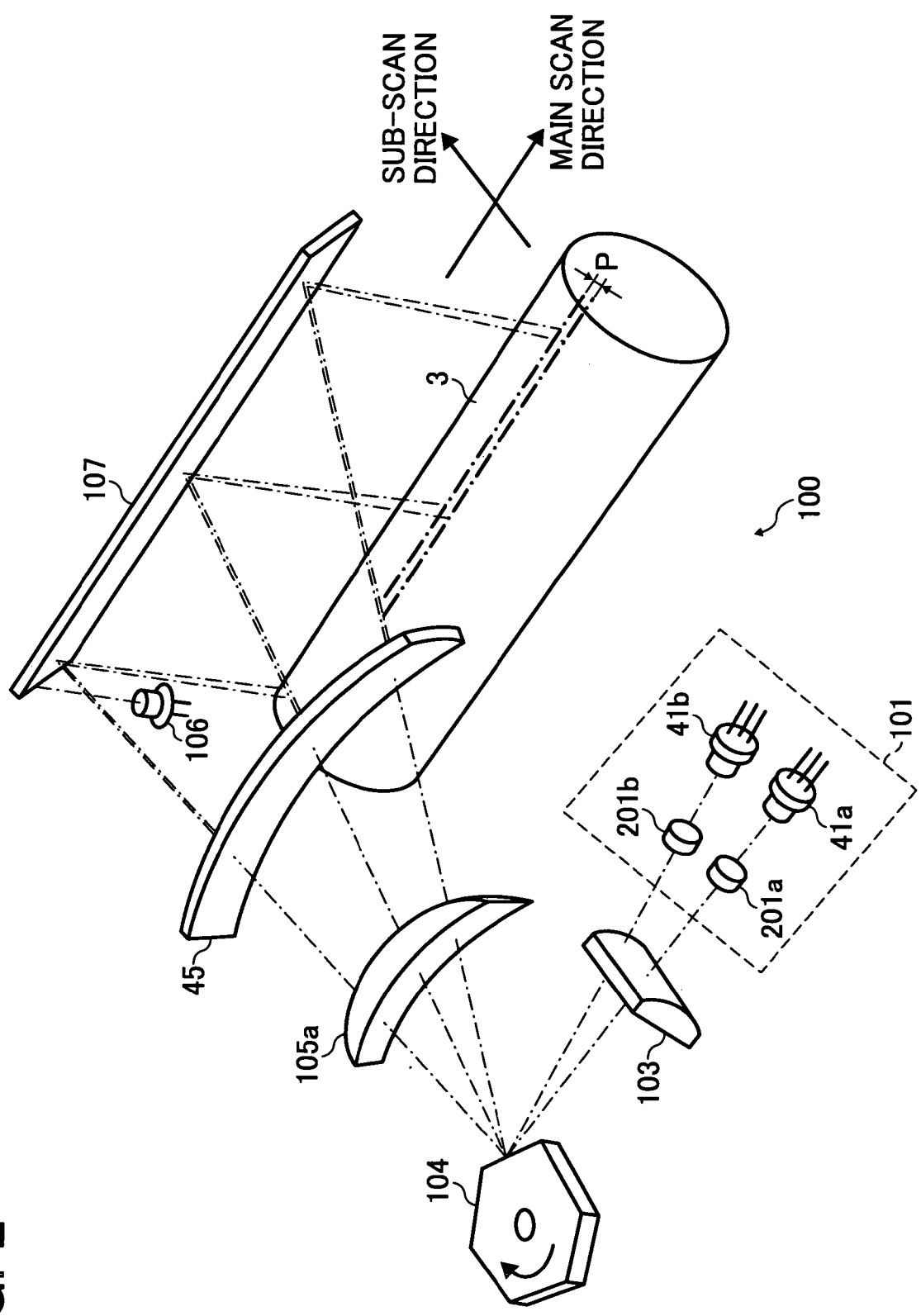
FIG. 2 is a schematic diagram illustrating a multi-beam optical scanning apparatus, according to an exemplary embodiment.

Referring now to FIG. 2, there is provided a schematic diagram illustrating the multi-beam optical scanning apparatus 100 according to one exemplary embodiment. The optical scanning apparatus 100 includes at least an LD (laser diode) unit 101, a cylindrical lens 103, a polygon mirror 104, an fθ lens 105a, a toroidal lens 45, a synchronization detection sensor 106, a deflecting mirror 107, and so forth.

In the optical scanning apparatus 100 of FIG. 2, two light beams emitted from the LD (laser diode) unit 101 enter the polygon mirror 104 through the cylindrical lens 103.

Each incident light beam entering the polygon mirror 104 is deflected by the rotation of the polygon mirror 104. Each incident light beam then exposes and scans the photoreceptor 3 in a main scan direction at a beam pitch P in a sub-scan direction through an optical scanning system consisting of the fθ lens 105a and the toroidal lens 45 for correction of an optical face tangle error, and the deflecting mirror 107. The polygon mirror 104 is rotatively driven by a polygon motor.

The synchronization signal detection sensor 106 serving as a line synchronization signal generator detects the light beams from the toroidal lens 45 at a predetermined position outside the writing region of the photoreceptor 3. The synchronization detection sensor 106 detects the two light beams entered through the LD unit 101, the cylindrical lens 103, the polygon mirror 104, the fθ lens 105a and the toroidal lens 45, and outputs an image writing position synchronization signal.

When a first light source 41a and a second light source 41b each formed of a semiconductor laser are driven based on the image signal, the LD unit 101 shown in FIG. 2 emits two light beams that are modulated in accordance with the image signal. When using the semiconductor lasers, it is possible to attain the LD unit 101 having the light sources at low cost and having a long product life.

The LD unit 101 is provided with a beam pitch adjustment mechanism which adjusts a beam pitch P in the sub-scan direction. The beam pitch adjustment mechanism adjusts the beam pitch P in the sub-scan direction when the LD unit 101 rotates against the optical scanning system.

In the LD unit 101, the light beams emitted from the first light source 41a and the second light source 41b are each formed into parallel rays of light by a first collimator lens 201a and a second collimator lens 201b.

A description will now be given of adjustment of the beam pitch by rotating the LD unit 101.

Figure 3:
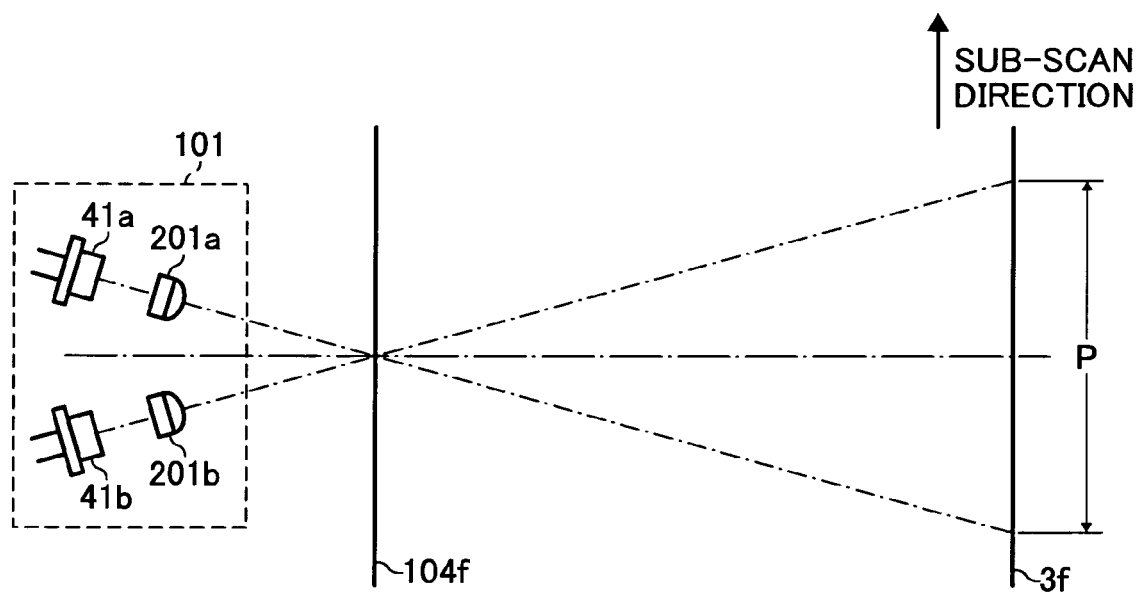
FIG. 3 is a schematic diagram illustrating an optical system, according to an exemplary embodiment.

Referring now to FIG. 3, there is provided a schematic diagram illustrating optical paths of the light beams from the LD unit 101 to the surface of the photoreceptor 3. A vertical direction of FIG. 3 corresponds to the sub-scan direction on the photoreceptor 3.

As shown in FIG. 3, the light beams emitted from the first light source 41a and the second light source 41b penetrate through the first collimator lens 201a and the second collimator lens 201b, and subsequently are emitted from the LD unit 101.

The light beams emitted from the LD unit 101 are reflected on a polygon surface 104f serving as a reflective surface of the polygon mirror 104, and enter a photoreceptor surface 3f of the photoreceptor 3.

In the LD unit 101, the first light source 41a and the second light source 41b are mounted such that a light flux emitted from the first light source 41a and a light flux emitted from the second light source 41b come to intersect near the polygon surface 104f. Furthermore, each optical axis and focal point of the light beams emitted from the first light source 41a and the second light source 41b is adjusted by the first collimator lens 201a and the second collimator lens 201b.

The first light source 41a and the second light source 41b are fixed to the LD unit 101a predetermined distance or space apart. The LD unit 101 having the first light source 41a and the second light source 41b fixed thereto can rotate relative to the optical scan system.

Rotating the LD unit 101 changes a size of the space between the first light source 41a and the second light source 41b in the sub-scan direction and a size of the space between the first light source 41a and the second light source 41b in the main scan direction.

For example, when there is no space between the first light source 41a and the second light source 42b in the sub-scan direction in the LD unit 101, that is, when the first light source 41a and the second light source 41b are aligned in a direction corresponding to the main scan direction, the beam pitch P on the photoreceptor surface 3f is 0.

However, in reality, due to optical design, adjustment of the collimator lenses 201, variations in the dimensions of the optical elements constituting the optical system, and so forth, the pitch width on the photoreceptor surface 3f may not be zero even if there is no space between the first light source 41a and the second light source 41b in the sub-scan direction in the LD unit.

In the optical system shown in FIG. 3, the space between the first light source 41a and the second light source 41b of the LD unit 101 in the sub-scan direction corresponds to the beam pitch P on the photoreceptor surface 3f. When the space between the first light source 41a and the second light source 41b changes, the size of the beam pitch P also changes.

Accordingly, when the LD unit 101 is rotated, the space between the two light sources in the sub-scan direction changes. Therefore, by rotating the LD unit 101, it is possible to adjust the beam pitch P on the photoreceptor surface 3f.

Figure 4:
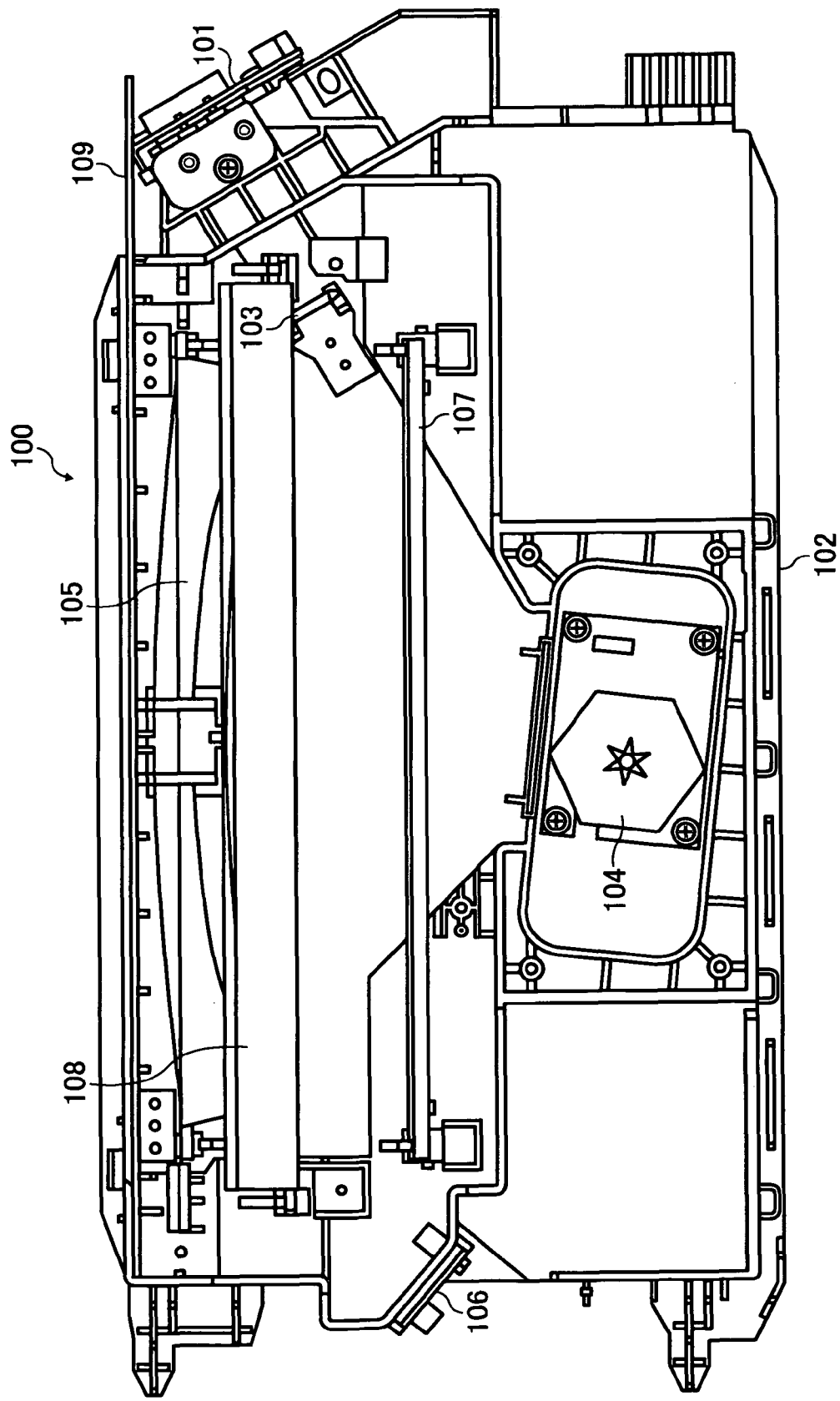
FIG. 4 is a top view illustrating the optical scanning apparatus of FIG. 2, according to an exemplary embodiment.

Next, a description will be given of the optical scanning apparatus 100 according to the exemplary embodiment with reference to FIG. 4, which provides a top view illustrating the optical scanning apparatus 100.

The optical scanning apparatus 100 includes at least the LD unit 101 and an optical housing 102. The LD unit 101 serves as the light source unit and includes the semiconductor lasers as the light source. The optical housing 102 serving as an optical element unit is equipped with the optical elements of the optical scanning system.

Figure 5:
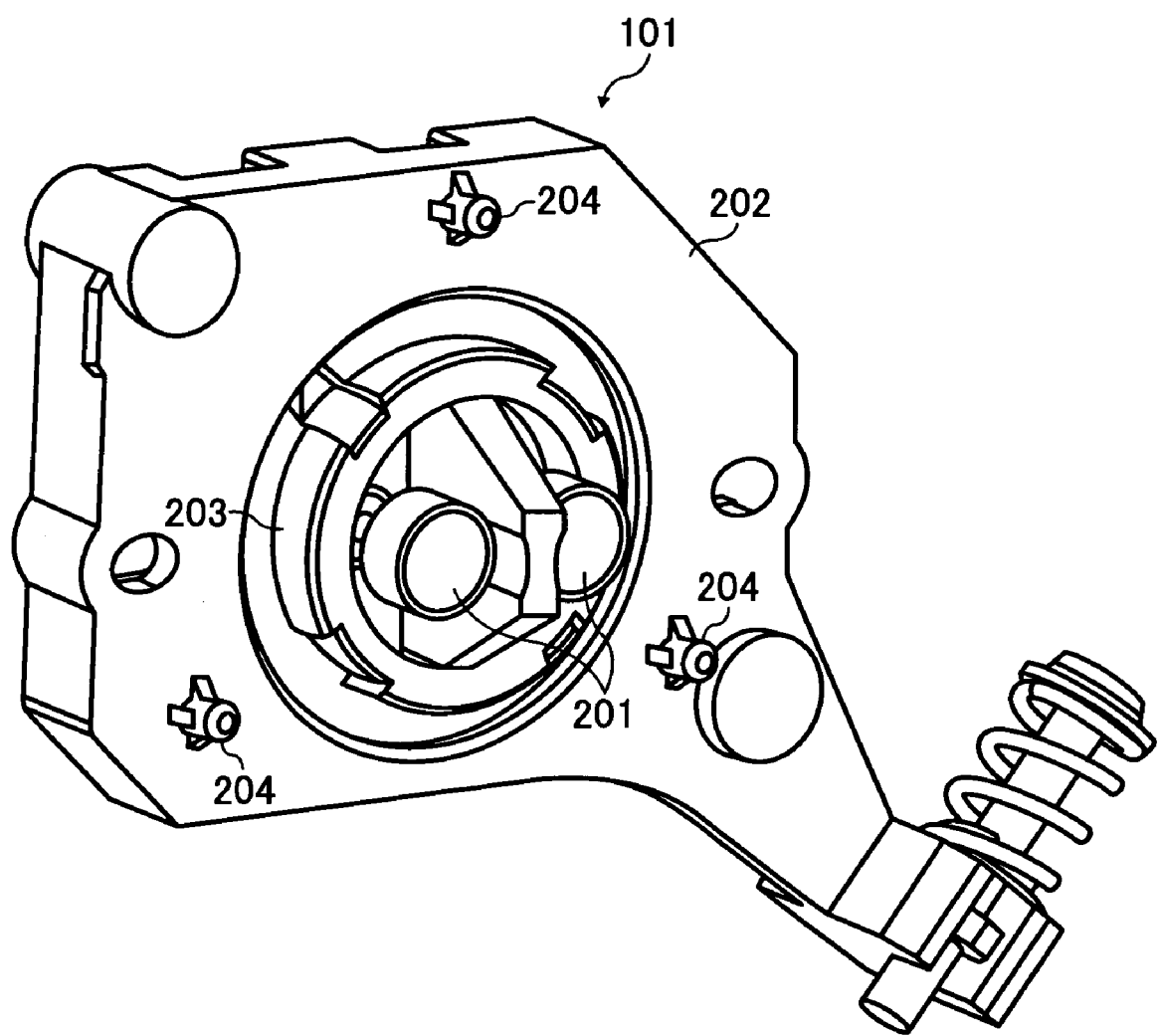
FIG. 5 is a perspective view illustrating a laser diode (LD) unit as viewed from an optical housing, according to an exemplary embodiment.

Referring now to FIG. 5, there is provided a perspective view illustrating the LD unit 101 as viewed from the optical housing 102. In FIG. 5, the LD unit 101 includes the plurality of the semiconductor lasers, not shown, the same number of the collimator lenses 201 as that of the semiconductor lasers, and a holder 202 configured to hold the semiconductor lasers and the collimator lenses 201.

The collimator lenses 201 serve as lenses that convert divergent beams emitted from the semiconductor lasers to parallel lights. The semiconductor lasers are pressed into the holder 202. After optimizing the parallelism and the optical axis of the penetrating lights, the positions of the collimator lenses 201 are determined in the holder 202 and adhered thereto.

The optical housing 102 includes an aperture, not shown, that forms the light beams emitted from the LD unit 101 into a certain shape. The optical housing 102 also includes the cylindrical lens 103 that focuses the lights onto the surface of the photoreceptor 3 serving as a scanned surface and the polygon mirror 104 that causes the light fluxes to scan the surface of the photoreceptor 3.

Furthermore, the optical housing 102 includes an fθ mirror 105 that focuses the light fluxes onto the photoreceptor 3 in the main scan direction and converts the light fluxes deflected and scanned by the polygon mirror 104 at a constant angular speed to a constant speed on the photoreceptor 3.

In the optical housing 102, the synchronization detection sensor 106 is disposed at a position outside an effective image region where the light fluxes are focused. The light fluxes are reflected at the position outside the effective image region of the fθ mirror 105, and pass through a correction lens 108 which corrects the optical face tangle error.

The synchronization detection sensor 106 receives the light reflected by a second deflecting mirror, not shown. Detection of the light by the synchronization detection sensor 106 signals the start of writing in the main scan direction.

The deflecting mirror 107, the correction lens 108, and a dust-proof glass 109 are included in the optical housing 102.

The light beams emitted from the LD unit 101 strike the polygon mirror 104 through the cylindrical lens 103 and are reflected thereby. The reflected light beams are reflected sequentially by the fθ mirror 105 and the deflecting mirror 107, and pass through the correction lens 108. After passing through the dust-proof glass 109, the light beams arrive at the surface of the photoreceptor 3.

Similar to the optical scanning apparatus illustrated in FIG. 2, the optical scanning apparatus 100 according to the exemplary embodiment can adjust the beam pitch P on the photoreceptor 3 by rotation of the LD unit 101 relative to the optical scanning system. In other words, the LD unit 101 is rotated relative to the optical housing 102 having the optical scanning system. Accordingly, the beam pitch P in the sub-scan direction on the photoreceptor 3 can be adjusted.

The light fluxes irradiated by the LD unit 101 at a desired angle intersect in the vicinity of the polygon mirror 104, and are exposed on the photoreceptor 3 with a certain gap between each other.

The LD unit 101 is fixed to a shaft relative to the optical housing 102 so that the position of the LD unit 101 can be rotatively adjusted around the shaft in the rotation direction relative to the optical housing 102. Accordingly, it is made possible to adjust the beam pitch P on the photoreceptor 3.

Figure 6:
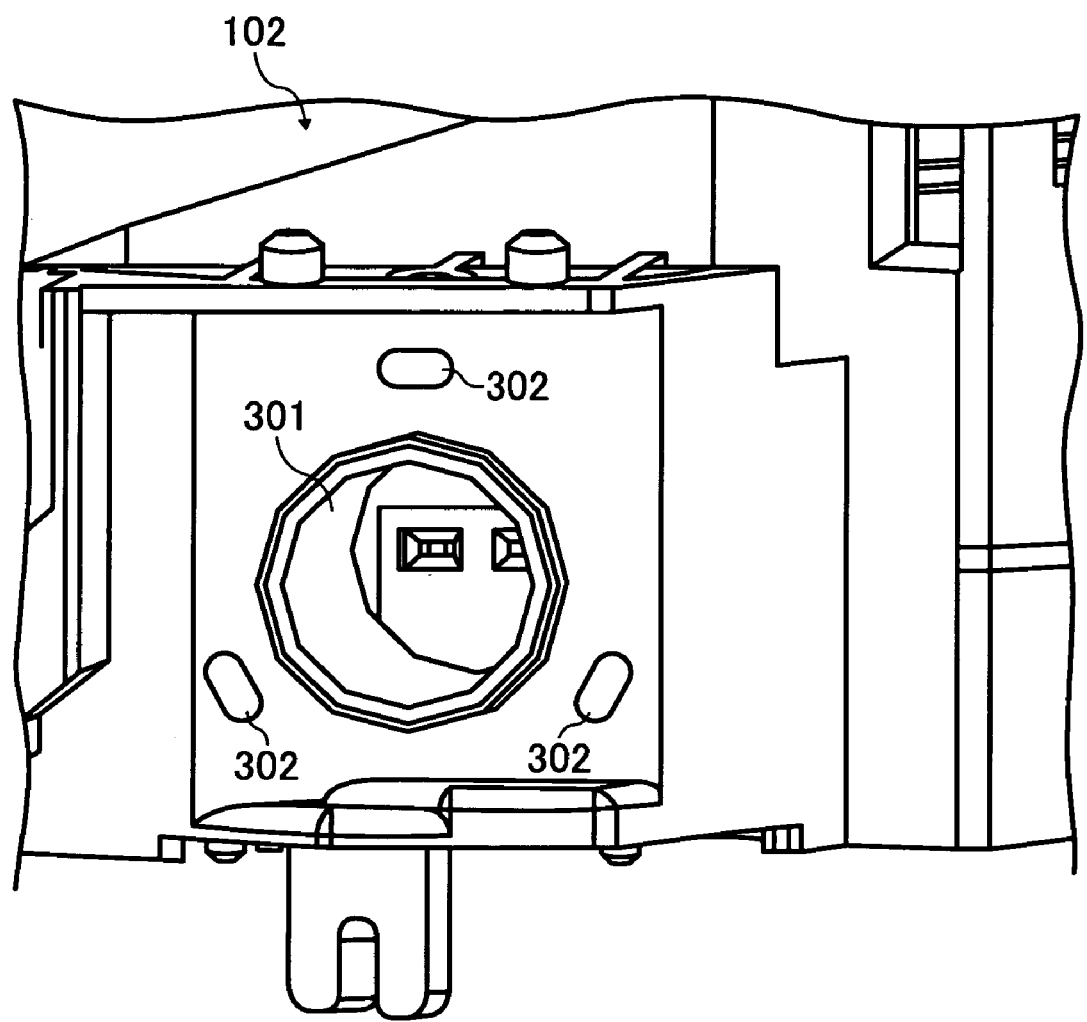
FIG. 6 is an enlarged perspective view illustrating an installation portion of the optical housing to which the LD unit of FIG. 5 is installed, according to an exemplary embodiment.

Referring now to FIG. 6, there is provided an enlarged perspective view illustrating an installation portion of the optical housing 102 to which the LD unit 101 is installed.

As shown in FIG. 5, the holder 202 of the LD unit 101 includes a cylindrical portion 203 and three protrusions 204. The cylindrical portion 203 is provided in a protruding manner so as to determine a position in a direction perpendicular to the optical housing 102 and the optical axis of the light beams.

As shown in FIG. 6, in order to accommodate the shape of the holder 202, the optical housing 102 includes a circular hole 301 for accommodating the protruding cylindrical portion 203, and three bearing holes 302 for accommodating the three protrusions 204.

Figure 7:
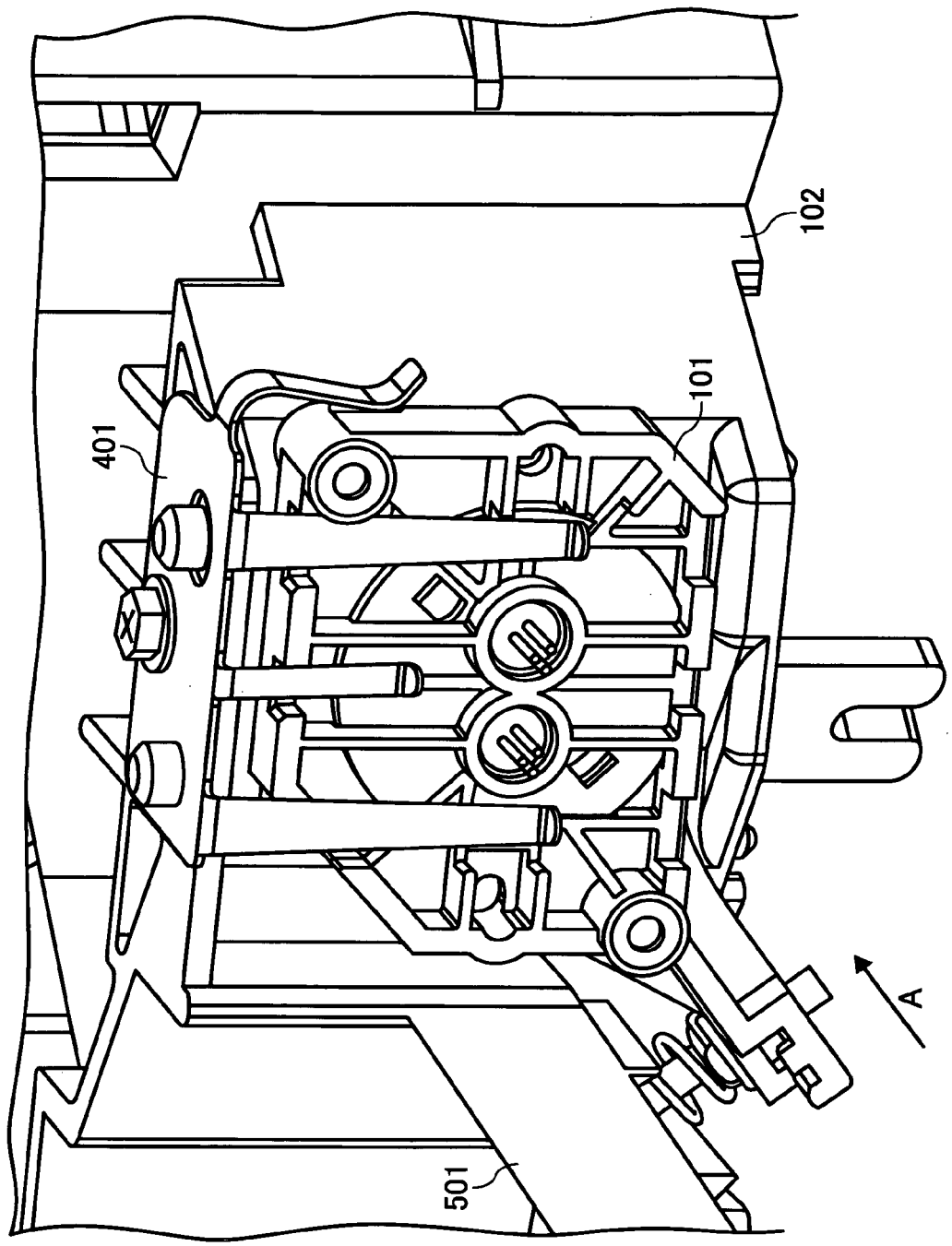
FIG. 7 is a perspective view illustrating the installation portion of the optical housing in a state in which the LD unit is installed thereto, according to an exemplary embodiment.

Referring now to FIG. 7, there is provided an explanatory perspective view illustrating the installation portion of the optical housing 102 illustrated in FIG. 6 in a state in which the LD unit 101 is installed thereto.

In FIG. 7, the cylindrical portion 203 of the holder 202 of the LD unit 101 and the circular hole 301 of the optical housing 102 are engaged. The three protrusions 204 and the bearing holes 302 are engaged. Accordingly, the LD unit 101 and the optical housing 102 are secured together except at the position rotatable in the rotation direction due to the engagement of the cylindrical portion 203 with the circular hole 301.

As shown in FIG. 7, a resilient member 401, for example, a leaf spring, provided to the optical housing 102 biases the LD unit 101 in the optical axis direction. Accordingly, the LD unit 101 is pressed and held against the optical housing 102.

Figure 8:
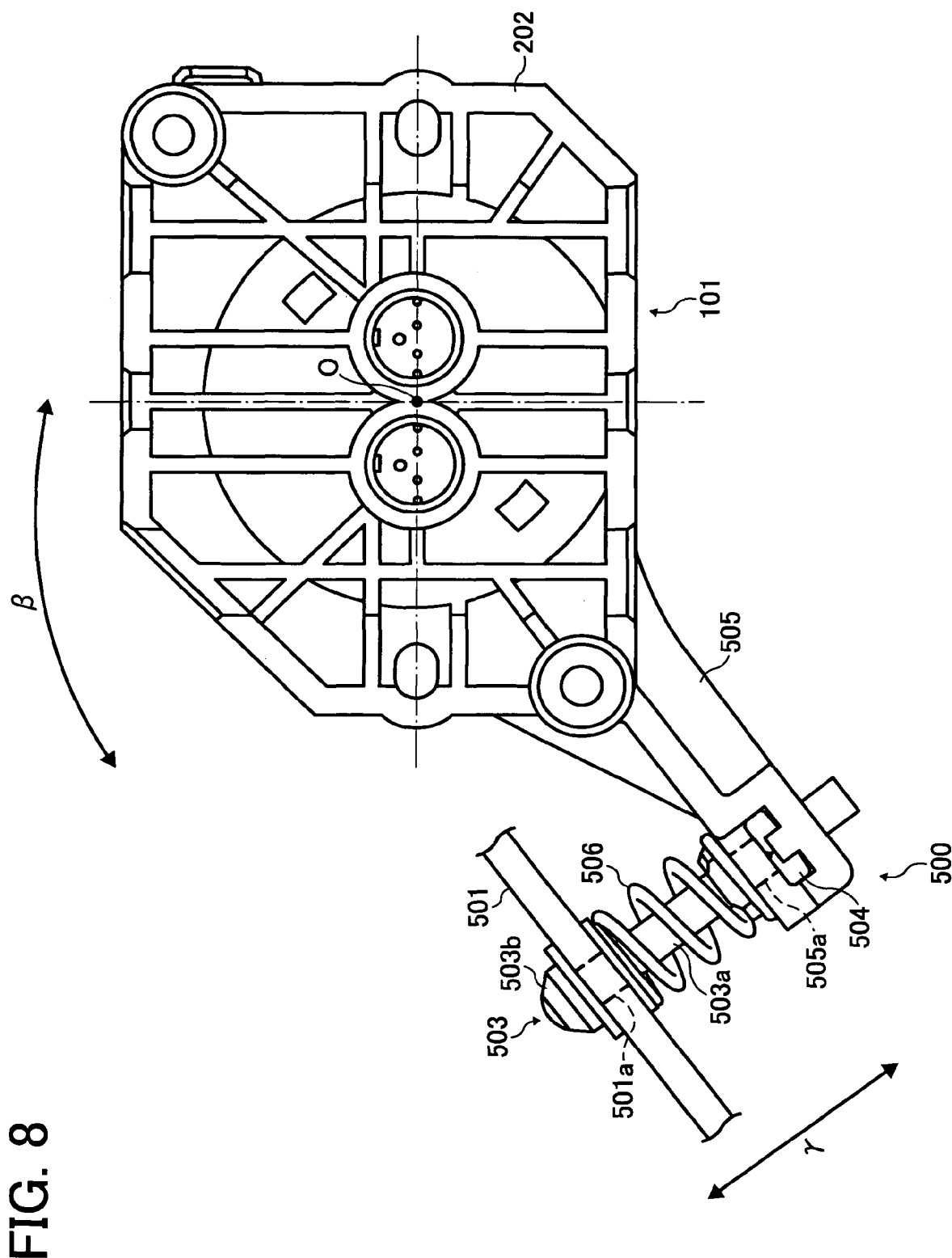
FIG. 8 is a schematic diagram illustrating a rotation adjustment mechanism, according to an exemplary embodiment.

Referring now to FIG. 8, there is provided an explanatory diagram illustrating the rotation adjustment mechanism which adjusts the position of the LD unit 101 in the rotation direction relative to the optical housing 102 and secures the LD unit 101 at a desired position in the rotation direction relative to the optical housing 102. FIG. 8 illustrates a portion of FIG. 7 as viewed from a direction indicated by arrow A in FIG. 7.

As explained with reference to FIGS. 5, 6 and 7, fitting the cylindrical portion 203 into the circular hole 301 allows the LD unit 101 to rotate relative to the housing 102.

In FIG. 8, the LD unit 101 is rotatable about a center axis of rotation O in a direction shown by arrow β relative to the optical housing 102. The center axis of rotation O is a center axis of a substantially circular cylindrical portion 203 and the circular hole 301.

The adjustment of the position of the LD unit 101 in the rotation direction relative to the optical housing 102 is performed by rotating a rotation adjustment screw 503, which is a screw for an adjustment and included in a rotation adjustment unit 500. The rotation adjustment unit 500 includes the rotation adjustment screw 503 and an adjustment nut 504.

The rotation adjustment screw 503 includes a screw head 503b serving as a tool engagement portion having a groove that engages a tool, and a screw main body 503a having threads along a cylinder. When the rotation adjustment screw 503 is turned about the center axis of the screw main body 503a, the rotation adjustment screw 503 moves in the center axis direction.

The holder 202 of the LD unit 101 includes an arm 505 serving as a screw insertion portion of the light source unit. The arm 505 includes a through-hole 505a through which the screw main body 503a is inserted.

The optical housing 102 includes a supporting plate 501 serving as a screw insertion portion of the optical element unit. The supporting plate 501 includes a through-hole 501a through which the screw main body 503a is inserted.

The rotation adjustment screw 503 is fastened in a direction shown by arrow γ in FIG. 8, such that the center axis of rotation direction of the screw main body 503a corresponds to a tangent line to a circle having the center axis of rotation O in the center.

The rotation adjustment unit 500 includes at least the adjustment nut 504 and the rotation adjustment screw 503. The adjustment nut 504 is provided to a nut installation portion provided to the arm 505 of the holder 202.

The adjustment nut 504 is provided to the nut installation portion of the arm 505. The rotation adjustment screw 503 is inserted into the through-hole 501a provided to the supporting plate 501 of the optical housing 102. When the rotation adjustment screw 503 is fastened to the adjustment nut 504, the flexibility of the LD unit 101 relative to the optical housing 102 in the rotation direction, that is, the arrow-β direction in FIG. 8 is reduced, if not eliminated entirely. Accordingly, the LD unit 101 can be secured to the optical housing 102.

As shown in FIG. 8, in a state in which the rotation adjustment screw 503 is fastened to the adjustment nut 504, the rotation adjustment screw 503 is fixed to the supporting plate 501 in the center axis direction (the arrow γ-direction) in FIG. 8.

The adjustment nut 504 is fixed to the arm 505. When the rotation adjustment screw 503 is turned using a tool such as a screwdriver or the like causing an external force, the positional relation between the rotation adjustment screw 503 and the adjustment nut 504 in the γ-direction changes.

Accordingly, it is made possible to adjust the distance between the arm 505 and the supporting plate 501 in the γ-direction. As a result, it is made possible to adjust the position of the LD unit 101 relative to the optical housing 102 in the rotation direction (the arrow-β direction), thereby being able to obtain the desired beam pitch P.

It should be noted that the adjustment nut 504 as internal threads engaging the rotation adjustment screw 503 as external threads is provided to the rotation adjustment unit 500 independently of the arm 505 in FIG. 8. Alternatively, a screw hole may be directly provided to the arm 505 so that the holder 202 integrally includes the internal threads.

When being fixed only by the screw, the LD unit 101 may move slightly due to backlash from the screw. When the movement of the LD unit 101 in the rotation direction relative to the optical unit 102 is secured by the rotation adjustment screw 503 and the adjustment nut 504, rattle may occur in the rotation direction. Consequently, the value of the beam pitch P may not be fixed.

In order to reduce, if not prevent entirely, rattle in the rotation direction, and to maintain an appropriate beam pitch P, a coil spring 506 serving as a resilient member is provided between the supporting plate 501 and the arm 505, according to the exemplary embodiment.

The movement of the supporting plate 501 separating from the arm 505 is regulated by the screw head 503b of the rotation adjustment screw 503. The movement of the arm 505 separating from the supporting plate 501 is regulated by the adjustment nut 504.

The coil spring 506 biases the supporting plate 501 and the arm 505 such that the supporting plate 501 and the arm 505 separate from each other. Accordingly, when being biased by the coil spring 506, it is possible to reduce effectively, if not prevent entirely, the effect of backlash.

Furthermore, the coil spring 506 presses against the arm 505 of the LD unit 101 and the supporting plate 501 of the optical housing 102 at a predetermined pressure when adjusting the beam pitch P.

When the rotation of the LD unit 101 is adjusted by tightening the rotation adjustment screw 503, the coil spring 506 presses against a base of the rotation adjustment screw 503 and the adjustment nut 504, thereby preventing the base of the rotation adjustment screw 503 from separating from the supporting plate 501. Accordingly, a proper space between the supporting plate 501 and the arm 505 can be maintained.

In the rotation adjustment unit 500 shown in FIG. 8, a structure using the coil spring as the resilient member is used. However, the resilient member is not limited to the coil spring. Alternatively, the resilient member may be made of a resilient material such as rubber, sponge, or any other suitable material.

In other words, any other suitable resilient member may be used as long as the resilient member has the resilience capable of pressing against the supporting plate 501 and the arm 505 while the beam pitch is properly adjusted.

The optical scanning apparatus 100 includes the rotation adjustment unit 500 equipped with the rotation adjustment screw 503 that adjusts the position of the LD unit 101 in the rotation direction relative to the optical housing 102 due to the external force. Accordingly, the beam pitch P can be adjusted without a driving device, for example, a stepping motor or the like.

Because the driving device is not used, a simple structure may be attained, thereby making it possible to reduce the production cost of the optical scanning apparatus 100. Furthermore, lacking a driving device there is no risk of an electrical failure, so that a failure of the optical scanning apparatus 100 is less likely to occur.

In a structure in which an external force acts on the adjustment screw 503 in a manner such that the LD unit 101 is rotated to adjust the beam pitch P, it is possible to enhance adjustment resolution when the thread pitch of the rotation adjustment screw 503 is reduced.

Next, a description will be given of installation of the optical scanning apparatus 100 to the image forming apparatus 1.

Figure 9:
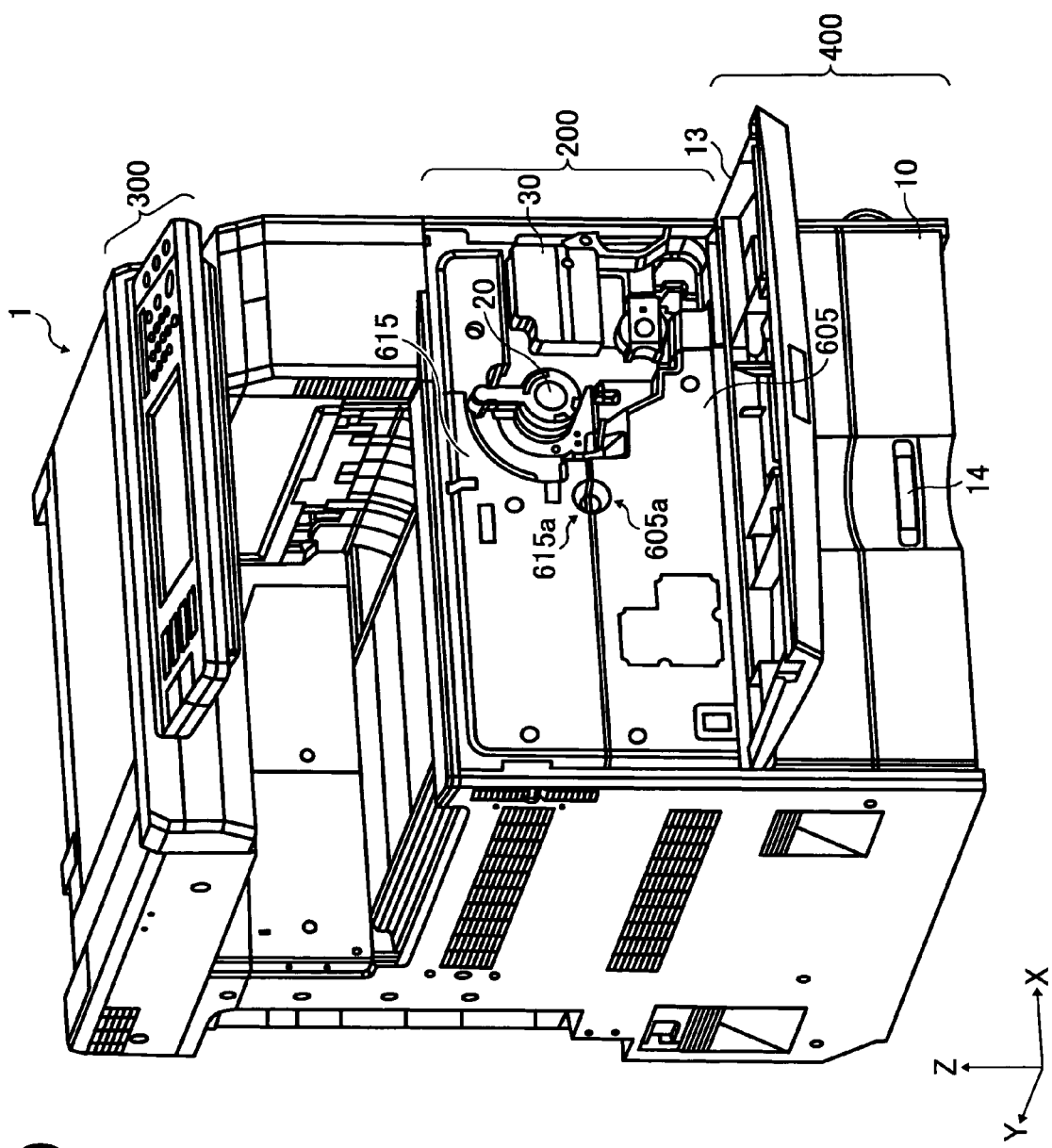
FIG. 9 is a perspective view illustrating the image forming apparatus from which a reading unit is removed, according to an exemplary embodiment.

Referring to now to FIG. 9 there is provided a perspective view illustrating the image forming apparatus 1 of FIG. 1.

As shown in FIG. 9, a front cover 13 is provided to one side of the image forming apparatus 1 and is configured to be openable and closeable. When the front cover 13 is opened, a front portion of components which need to be periodically replaced, for example, the toner bottle 20 and the process cartridge 30 including at least the photoreceptor 3, are exposed so that these components can be replaced.

Furthermore, when the front cover 13 is opened, an exterior unit consisting of an upper exterior cover 615 including an upper cover recessed portion 615a and a bottom exterior cover 605 including a bottom cover recessed portion 605a is exposed.

Figure 10:
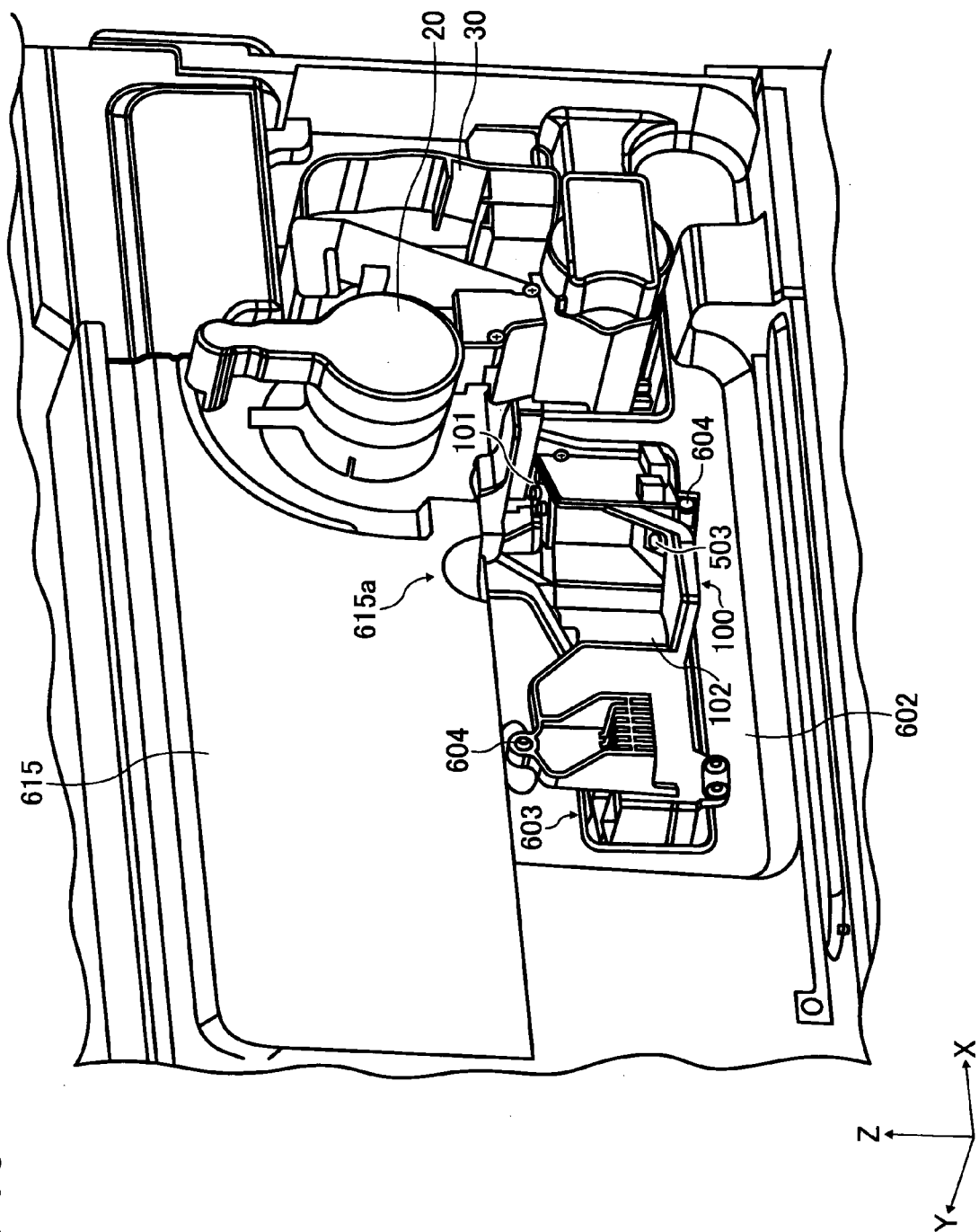
FIG. 10 is an enlarged perspective view illustrating an image forming unit from which a bottom exterior cover is removed, according to an exemplary embodiment.

Referring now to FIG. 10, there is provided an enlarged perspective view illustrating the image forming unit 200 of FIG. 9 from which the bottom exterior cover 605 is removed.

When the bottom exterior cover 605 is removed, the front end portion of the optical scanning apparatus 100 and a main structure which supports the optical scanning apparatus 100 are exposed.

Figure 11:
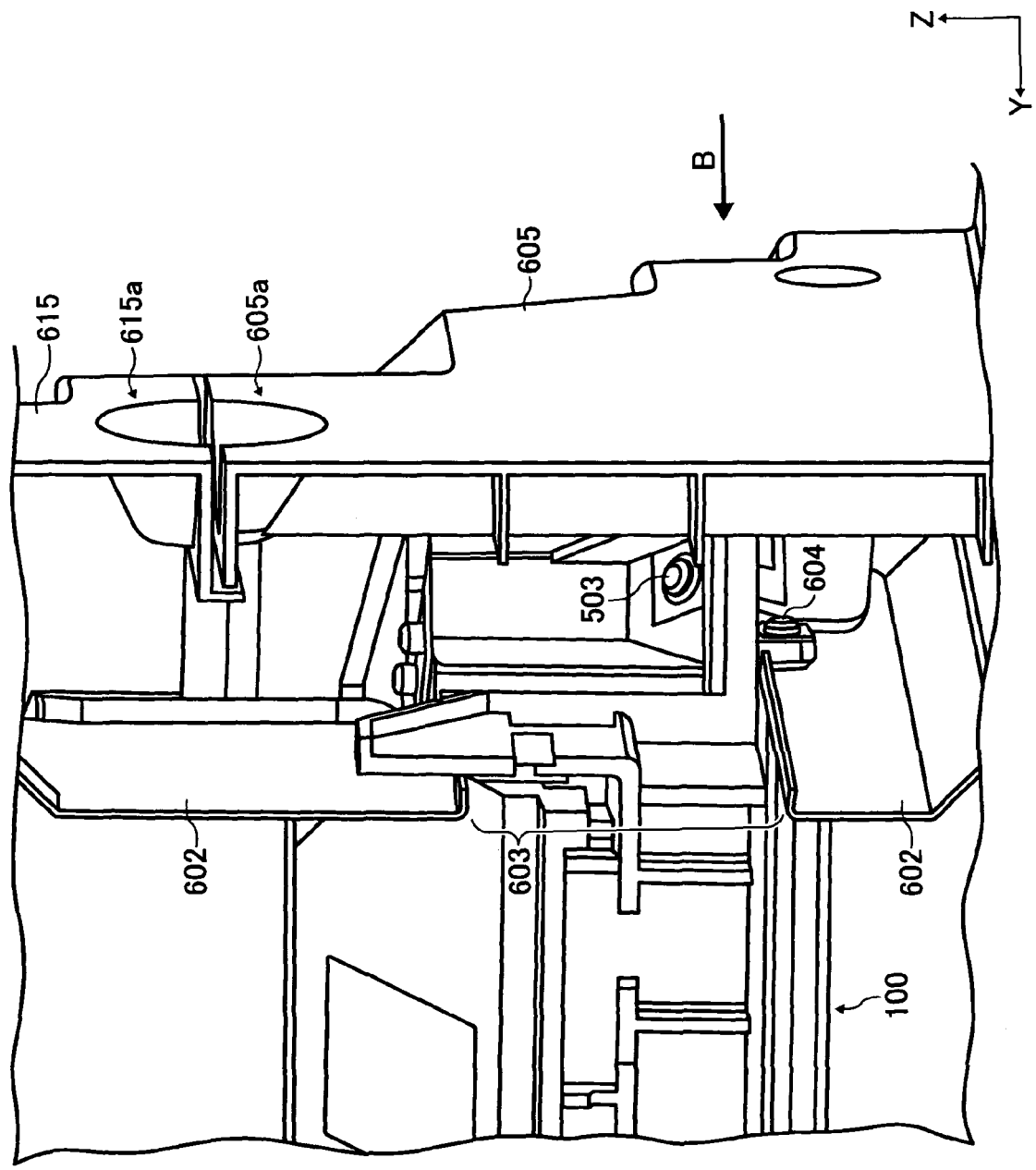
FIG. 11 is an enlarged cross-sectional view illustrating surrounding structure of the optical scanning apparatus.
Figure 12:
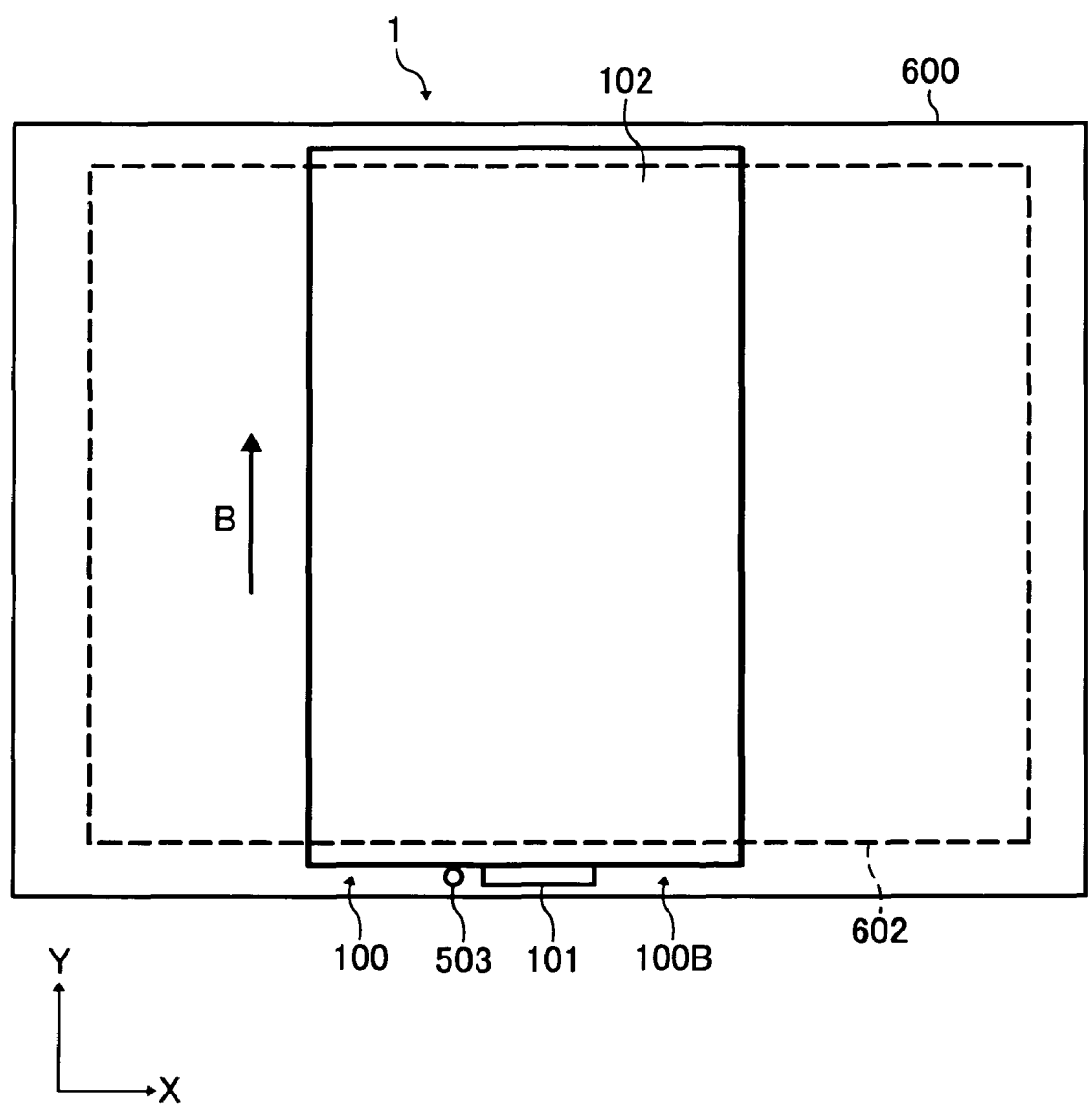
FIG. 12 is a schematic plan view illustrating the optical scanning apparatus installed in the image forming apparatus.

FIG. 11 is an enlarged cross-sectional view illustrating structure surrounding the optical scanning apparatus 100 along line X-Y in FIG. 9. FIG. 12 is a schematic plan view illustrating the optical scanning apparatus 100 installed in the image forming apparatus 1 along the line X-Y.

In FIG. 12, the exterior unit of the image forming apparatus 1 including the bottom exterior cover 605 and the upper exterior cover 615 is denoted by reference numeral 600. The main structure 602 includes at least an opening 603 serving as an installation portion from which the optical scanning apparatus 100 is mounted.

When the beam pitch P of the optical scanning apparatus 100 is adjusted prior to shipment, the optical scanning apparatus 100 is inserted into the opening 603 of the main structure 602 of the image forming apparatus 1 in an arrow B direction shown in FIG. 11. Subsequently, the optical scanning apparatus 100 is fixed to the main structure 602 by fixing screws 604.

Upon shipment, in the image forming apparatus 1, the optical scanning apparatus 100 is fastened by the fixing screws 604. Subsequently, the bottom exterior cover 605 which covers the front end portion of the optical scanning apparatus 100 is fixed to the main structure 602 so that the optical scanning apparatus 100 is kept out of contact with the user during use.

The optical scanning apparatus 100 is installed in the image forming apparatus 1 by inserting the optical scanning apparatus 100 into the opening 603 of the main structure 602 of the image forming apparatus 1 in the arrow B direction. When the optical scanning apparatus 100 is pulled out in the direction opposite to the arrow B direction, the optical scanning apparatus 100 can be removed from the image forming apparatus 1.

In a state in which the optical scanning apparatus 100 is installed in the image forming apparatus 1, the rotation adjustment screw 503 of the rotation adjustment unit 500 is located at a rear end surface 100B of the optical scanning apparatus 100 in the inserting direction (arrow B direction) of the installation of the optical scanning apparatus 100 to the image forming apparatus 1.

In addition, the rotation adjustment screw 503 of the rotation adjustment unit 500 is located between the main structure 602 and the exterior unit 600 (bottom exterior cover 605).

When the bottom exterior cover 605 is closed after the optical scanning apparatus 100 is installed, the rotation adjustment unit 500 is positioned between the side surface of the main structure 602 facing the bottom exterior cover 605, and the exterior cover 605. Accordingly, when the bottom exterior cover 605 is removed, the rotation adjustment screw 503 can be turned to adjust the beam pitch P without taking out the optical scanning apparatus 100 from the main structure 602.

With such a structure, the rotation adjustment unit 500 becomes accessible by removing the bottom exterior cover 605 covering the rear end surface 100B of the optical scanning apparatus 100. Accordingly, the position of the LD unit 101 relative to the optical housing 102 in the rotation direction is adjusted upon maintenance of the optical scanning apparatus 100.

Therefore, external force can be exerted on the rotation adjustment screw 503 of the rotation adjustment unit 500 while the optical scanning apparatus 100 is installed in the image forming apparatus 1. Time to pull out the optical scanning apparatus 100 from the image forming apparatus 1 is not needed, thereby enhancing maintainability.

After the image forming apparatus 1 is shipped, when the parts of the optical scanning apparatus 100 fail and need to be replaced on the market, and/or the beam pitch P needs to be readjusted due to deterioration over time, maintenance personnel can re-adjust the beam pitch P by removing the bottom exterior cover 605 and turning the rotation adjustment screw 503.

Next, a detailed description will be given of turning the rotation adjustment screw 503 by exerting an external force.

Figure 13:
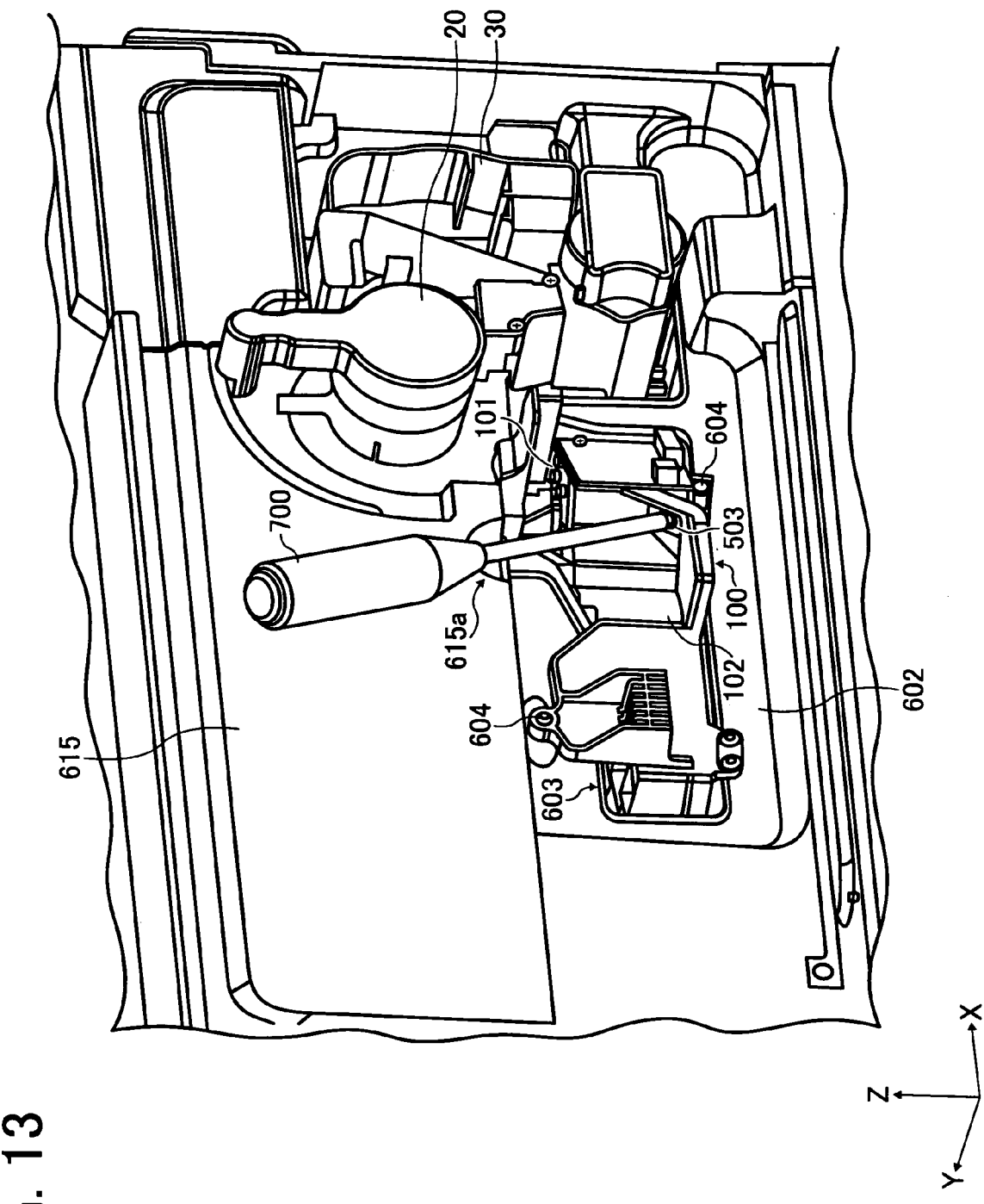
FIG. 13 is a perspective view illustrating an external force, for example, a tool acting on a rotation adjustment screw.

Referring now to FIG. 13, there is provided an explanatory perspective view illustrating a driver 700 exerting the external force to the rotation adjustment screw 503.

As shown in FIG. 13, the groove of the screw head 503b of the rotation adjustment screw 503, which is the portion that engages a tip of the driver 700, faces vertically upward. Since the height of the image forming apparatus is generally below eye level, the groove of the screw head 503b can be viewed with ease, and thus the beam pitch P can be adjusted while confirming visibility.

Because the rotation adjustment screw 503 is disposed at the rear end surface 100B of the optical scanning apparatus 100, the driver 700 can be inserted from the vertically upward position so as to adjust the position of the LD unit 101 in the rotation direction without removing the optical scanning apparatus 100 from the main structure 602.

As shown in FIG. 13, the upper cover recessed portion 615a is provided in the upper exterior cover 615 of the exterior unit 600 disposed above the bottom exterior cover 605 covering the rear end surface 100B of the optical scanning apparatus 100. The upper cover recessed portion 615a serves as a guide which guides the tip of the driver 700 to the groove of the screw head 503b when the bottom exterior cover 605 is removed.

In other words, when moving the driver 700 from the vertically upper position to the vertically lower position along with the depressed shape of the upper cover recessed portion 615a, the tip of the driver 700 engages the groove of the screw head 503b.

Such a structure as shown in FIG. 13 using the driver 700 to adjust the position of the LD unit 101 in the rotation direction makes it possible to secure the visibility of the rotation adjustment unit 500 during the adjustment operation. Accordingly, maintainability is enhanced.

Furthermore, when the external force acts on the rotation adjustment screw 503 by using the driver 700, the size of the adjustment screw may be reduced compared with adjusting the adjustment screw by hand.

According to the above-described exemplary embodiments, a screw having the screw head 503b with the groove is used as the rotation adjustment screw 503. Alternatively, however, a screw or a bolt, for example, a screw with a hexagonal washer or a hexagonal head bolt, may be used as the rotation adjustment screw 503, as long as the threads of the screw or the bolt are helical so that distance is adjustable by turning the screw.

Figure 14:
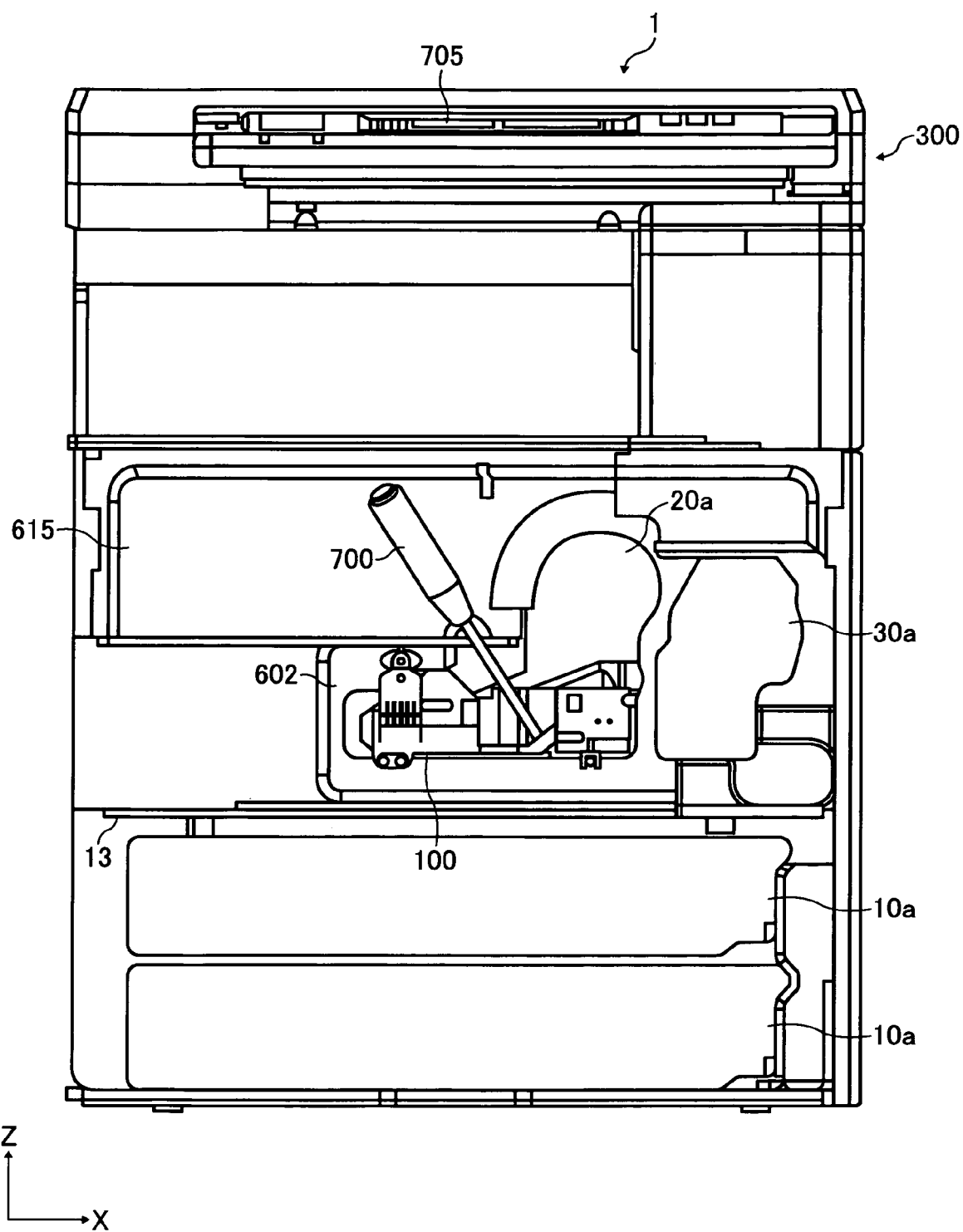
FIG. 14 is a front view illustrating the image forming apparatus from which a toner bottle, a process cartridge, and a sheet feed cassette are removed.

Referring now to FIG. 14, there is provided a schematic diagram illustrating the image forming apparatus 1 as viewed from the side (hereinafter referred to as a front) having the front cover 13 of the image forming apparatus 1 in a state where the toner bottle 20, the process cartridge 30, and the sheet feed cassette 10 are removed.

As shown in FIG. 14, when the front cover 13 is opened, a toner bottle installation portion 20a and a photoreceptor installation portion 30a are accessible from outside. The toner bottle 20 is mounted on the toner bottle installation portion 20a. The process cartridge 30 including the photoreceptor 3 is mounted on the photoreceptor installation portion 30a.

In other words, when the toner bottle 20 and the process cartridge 30 are pulled out from the front of the image forming apparatus 1, that is, the side from which the optical scanning apparatus 100 can be pulled out upon removal of the optical scanning apparatus 100 from the image forming apparatus 1, the toner bottle 20 and the process cartridge 30 can be removed from the image forming apparatus 1.

As described above, the rotation adjustment screw 503 is disposed at the rear end surface 100B of the optical scanning apparatus 100. Accordingly, the front cover 13 can be opened. By removing the bottom exterior cover 605, the position of the LD unit 101 in the rotation direction can be adjusted by using the driver 700 from the front of the image forming apparatus 1.

The toner bottle 20 and the process cartridge 30 are taken out from the front of the image forming apparatus 1. Therefore, some space is most likely secured in front of the image forming apparatus 1 so as to enable replacement of the components with ease. Even if an object needs to be placed in front of the image forming apparatus, the object is most likely movable, so that some working space for the replacement of the components can be easily provided.

In other words, it is generally the case that the image forming apparatus is disposed at such a place where some working space can be secured in front of the image forming apparatus so that the replaceable components can be replaced with ease.

According to the above-described exemplary embodiment, the rotation adjustment screw 503 is accessible from the front of the image forming apparatus 1 where some place for replacing the components can be secured with ease. Accordingly, maintenance personnel may easily be able to adjust the beam pitch P, thereby enhancing maintainability.

As shown in FIG. 14, an opening of sheet feed cassette installation portions 10a into which the sheet feed cassettes 10 are mounted faces the front of the image forming apparatus 1. As shown in FIG. 9, a handle 14 for pulling out the sheet feed cassettes 10 is also disposed at the front of the image forming apparatus 1. When the handle 14 is grasped to pull out the sheet feed cassettes 10 toward the front, the sheet feed cassettes 10 can be re-supplied with the transfer sheets P.

Generally, the transfer sheets P are re-supplied more often than the process cartridge 30 and the toner bottle 20. Therefore, in order to make it easy to re-supply the transfer sheets P, it is preferable that some space is provided in front of the image forming apparatus 1 from which the sheet feed cassettes 10 are pulled out.

As shown in FIG. 14, an operation unit 705 to which a user inputs operation information of the image forming apparatus 1 is provided to the front side of the image forming apparatus 1. In order to make it easy for the user to input the operation information, it is preferable that some space is provided in front of the image forming apparatus 1.

The rotation adjustment screw 503, which adjusts the beam pitch P of the optical scanning apparatus 100, is provided to the same side of the image forming apparatus 1 where the operation unit 705 is provided.

When the beam pitch P needs to be adjusted on the market, the maintenance personnel repeats an operation of adjusting the rotation adjustment screw 503 and outputting an image for verification. In such a case, the maintenance personnel can continuously operate facing the front of the image forming apparatus 1. Accordingly, the maintenance personnel do not have to move to the lateral sides other than the front side of the image forming apparatus 1, thereby making it possible for the maintenance personnel to easily adjust the beam pitch P and thus enhancing maintainability.

Furthermore, the photoreceptor 3, the developing unit 5, the transfer roller 6, the fixing unit 9, the sheet eject roller 18, and so forth associated with the electrophotographic process in the image forming apparatus 1 are disposed in a manner such that the installation of the optical scanning apparatus 100 is not hampered.

Accordingly, the optical scanning apparatus 100 becomes accessible whenever adjustment needs to be performed. Furthermore, upon replacement of the LD unit 101, it is possible to remove the optical scanning apparatus 100 without being hampered in doing so by other components. Therefore, down time of the image forming apparatus 1 can be reduced, thereby enhancing maintainability.

When the front cover 13 is opened and the bottom exterior cover 605 is removed, the position of the LD unit 101 in the rotation direction can be adjusted while visually confirming the rotation of the LD unit 101. Therefore, the visibility during adjustment is attained.

According to the above-described exemplary embodiments, the area from the portion of the optical housing communicating with the main structure to the rotation adjustment portion of the light source unit is disposed between the main structure and the exterior portion.

Even if the light source unit is disposed in a space between the front and rear of the main structure in the installation direction of the optical housing, when an opening through which a tool can be inserted to rotatively adjust the light source unit is provided to the main structure, the light source unit is rotatively adjustable without removing the light source unit from the main structure. Accordingly, adjustment operation and maintainability can be enhanced.

According to the above-described exemplary embodiments, the optical scanning apparatus includes a rotation adjustment portion. However, the present invention is not limited to such an arrangement, and therefore variations and modifications may be made without departing from the scope of the present invention.

For example, the rotation adjustment portion may be provided to a cover that covers the installation portion of the optical scanning apparatus after the optical scanning apparatus is installed in the image forming apparatus main body.

According to the above-described exemplary embodiments, the present invention is applicable to an image forming apparatus, for example, a printer. However, the present invention is not limited thereto, and therefore variations and modifications may be made without departing from the scope of the present invention.

According to the above-described exemplary embodiments, the rotation adjustment screw 503 of the rotation adjustment unit 500 is provided to the rear end surface 100B of the optical scanning apparatus 100. Alternatively, when the optical scanning apparatus 100 is installed in the image forming apparatus 1, and the rear end of the optical scanning apparatus 100 projects from the main structure 602, the rotation adjustment unit may be provided to the upper surface or the side surface of the projecting portion.

The image forming apparatus may be of a monochrome type or of a full-color image forming apparatus. A tandem-type image forming apparatus using an intermediate transfer medium may be used. The image forming apparatus is not limited to a copier, and it is contemplated that the image forming apparatus may be a printer or a facsimile or a multi-function machine equipped with a plurality of functions.

The adjustment member of the rotation adjustment unit to adjust the position of the light source unit in the rotation direction is not limited to a structure such as the rotation adjustment screw 503 which engages a tool, and alternatively may have a structure adjustable by hand.

Furthermore, elements and/or features of different exemplary embodiments may be combined with each other and/or substituted for each other within the scope of this disclosure and appended claims.

The number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the spirit and scope of the present invention, and all such modifications as would be obvious to one skilled in the art are intended to be included within the scope of the following claims.

What is claimed is:

1. An optical scanning apparatus detachably mountable in an image forming apparatus, comprising:
   a light source unit configured to simultaneously emit a plurality of light beams;
   an optical element unit including an optical element, configured to focus light beams deflected by the optical element onto a surface to be scanned, and hold the light source unit in a rotatively adjustable manner; and
   a rotation adjustment unit configured to adjust a position of the light source unit relative to the optical element unit in a rotation direction,
   wherein the rotation adjustment unit is disposed at a rear end of the optical scanning apparatus in a direction of insertion of the optical scanning apparatus in the image forming apparatus.

2. The optical scanning apparatus according to claim 1, wherein the rotation adjustment is activated by a tool.

3. The optical scanning apparatus according to claim 2, wherein the rotation adjustment unit comprises a tool engagement portion configured to engage the tool, and is disposed to face vertically upward.

4. The optical scanning apparatus according to claim 1, wherein:
   the rotation adjustment unit further comprises a screw member including threads formed along a cylinder, a center axis direction of the screw member configured to coincide with a tangent line to a circle with a center axis of rotation of the light source unit;
   the light source unit comprises a first screw insertion portion through which the screw member passes; and
   the optical element unit comprises a second screw insertion portion through which the screw member passes,
   a distance between the first screw insertion portion and the second screw insertion portion in the center axis direction of the screw member changing when the screw member is turned.

5. The optical scanning apparatus according to claim 4, wherein the rotation adjustment unit further comprises a resilient member configured to bias the first screw insertion portion and the second screw insertion portion in one of a separating direction along the center axis direction of the screw member, in which the first screw insertion portion and the second screw insertion portion move away from each other, and an approaching direction along the center axis direction of the screw member, in which the first screw insertion portion and the second screw insertion portion move toward each other.

6. The optical scanning apparatus according to claim 5, the resilient member is a coil spring.

7. The optical scanning apparatus according to claim 5, the resilient member is a molded resilient material.

8. The optical scanning apparatus according to claim 1, wherein a light source of the light beam emitted from the light source unit is a semiconductor laser.

9. An image forming apparatus, comprising:
   a latent image carrier including a surface configured to bear a latent image thereon;
   a developing unit configured to develop the latent image with toner to form a toner image;
   a transfer member configured to transfer the toner image onto a recording medium;
   an installation portion to which an optical scanning apparatus is detachably mounted; and
   the optical scanning apparatus detachable from the installation portion, configured to irradiate the surface of the latent image carrier with a scan light to form the latent image thereon, the optical scanning apparatus including:
   a light source unit configured to simultaneously emit a plurality of light beams;
   an optical element unit including an optical element, configured to focus the light beams deflected by the optical element onto a surface to be scanned, and hold the light source unit in a rotatively adjustable manner; and
   a rotation adjustment unit configured to adjust a position of the light source unit relative to the optical element unit in a rotation direction,
   wherein the rotation adjustment unit is disposed at a rear end of the optical scanning apparatus in a direction of insertion of the optical scanning apparatus in to the image forming apparatus.

10. The image forming apparatus according to claim 9, further comprising:
    a main structure including the installation portion, configured to hold the optical scanning apparatus; and
    an exterior unit configured to expose the installation portion upon installation and removal of the optical scanning apparatus,
    wherein when the exterior unit is closed after the optical scanning apparatus is installed, the rotation adjustment portion is positioned between a side surface of the main structure which is a side facing the exterior unit, and the exterior unit.

11. The image forming apparatus according to claim 9, further comprising:
    a replaceable supplemental developer container, configured to store a supplemental developer to be supplied to the developing unit,
    wherein the supplemental developer container is removable from the image forming apparatus when pulled out in a same direction as the direction of removing the optical scanning apparatus from the image forming apparatus.

12. The image forming apparatus according to claim 9, wherein the image carrier is replaceable and removable from the image forming apparatus when pulled out in the same direction as a direction in which the optical scanning apparatus is removed from the image forming apparatus.

13. The image forming apparatus according to claim 9, further comprising:

an operation unit to input operating information for the image forming apparatus, wherein the operation unit faces the same direction as the direction in which the optical scanning apparatus is removed from the image forming apparatus.

14. The image forming apparatus according to claim 9, further comprising a recording medium storage unit configured so that, upon installation of the recording medium to the recording medium storage unit, the recording medium storage unit is pulled out in the same direction as the direction in which the optical scanning apparatus is removed from the image forming apparatus.

15. The image forming apparatus according to claim 9, further comprising:
a guide configured to guide a tool to a tool engagement portion when the exterior unit is opened,
wherein the rotation adjustment unit includes the tool engagement portion configured to engage the tool.

16. An image forming apparatus, comprising:
a latent image carrier including a surface configured to bear a latent image thereon;
a developing unit configured to develop the latent image with toner to form a toner image;
a transfer member configured to transfer the toner image onto a recording medium;
an installation portion to which an optical scanning apparatus is detachably mounted; and
the optical scanning apparatus detachable from the installation portion, configured to irradiate the surface of the latent image carrier with a scan light to form the latent image thereon, the optical scanning apparatus including
a light source unit configured to simultaneously emit a plurality of light beams;
an optical element unit including an optical element, configured to focus the light beams deflected by the optical element onto a surface to be scanned, and hold the light source unit in a rotatively adjustable manner; and
a rotation adjustment unit configured to adjust a position of the light source unit relative to the optical element unit in a rotation direction,
wherein the rotation adjustment unit is disposed at an adjustable position when the optical scanning apparatus is installed in the image forming apparatus.

17. An image forming apparatus, comprising:
a latent image carrier including a surface, configured to bear a latent image thereon;
a developing unit to configured to develop the latent image with toner to form a toner image;
a transfer member configured to transfer the toner image onto a recording medium;
an installation portion to which an optical scanning apparatus is detachably mounted; and
the optical scanning apparatus detachable from the installation portion, configured to irradiate the surface of the latent image carrier with a scan light to form the latent image thereon, the optical scanning apparatus including:
a light source unit configured to simultaneously emit a plurality of light beams;
an optical element unit including an optical element, to focus light beams deflected by the optical element onto a surface to be scanned, and hold the light source unit in a rotatively adjustable manner;
a rotation adjustment unit disposed at a rear end of the optical scanning apparatus in a direction of insertion of the optical scanning apparatus in the image forming apparatus, to adjust a position of the light source unit relative to the optical element unit in a rotation direction when activated by a tool or by hand;
an installation portion to which an optical scanning apparatus is detachably mounted;
a main structure including the installation portion, to hold the optical scanning apparatus; and
an exterior unit to expose the installation portion during installation and removal of the optical scanning apparatus,
wherein when the exterior unit is closed after the optical scanning apparatus is installed, the rotation adjustment portion is positioned between a side surface of the main structure, which faces the exterior unit, and the exterior unit.

* * * * *